(12) United States Patent
Burt

(10) Patent No.: US 9,716,523 B1
(45) Date of Patent: Jul. 25, 2017

(54) WIRELESS COMMUNICATION ASSEMBLY

(71) Applicant: Eugene Burt, Columbus, GA (US)

(72) Inventor: Eugene Burt, Columbus, GA (US)

( * ) Notice: Subject to any disclaimer, the term of this patent is extended or adjusted under 35 U.S.C. 154(b) by 0 days.

(21) Appl. No.: 15/185,322

(22) Filed: Jun. 17, 2016

(51) Int. Cl.
*H04B 1/3827* (2015.01)
*H04L 12/24* (2006.01)

(52) U.S. Cl.
CPC ....... *H04B 1/3833* (2013.01); *H04L 41/0803* (2013.01)

(58) Field of Classification Search
USPC .......................... 455/575.1, 550.1, 517–520
See application file for complete search history.

(56) References Cited

U.S. PATENT DOCUMENTS

| | | | |
|---|---|---|---|
| 5,548,810 A | 8/1996 | Riddell et al. | |
| D433,396 S | 11/2000 | Wong | |
| 7,676,246 B2 | 3/2010 | Kreiter | |
| 7,813,696 B2 | 10/2010 | Kim | |
| 8,010,171 B2 | 8/2011 | Fettig et al. | |
| 8,064,898 B2 * | 11/2011 | Carnall | H04L 63/30 340/521 |
| 8,892,646 B2 * | 11/2014 | Chaturvedi | H04L 67/1046 370/260 |
| 9,014,661 B2 * | 4/2015 | deCharms | H04W 4/021 348/14.02 |
| 2002/0006806 A1 | 1/2002 | Kinnunen et al. | |
| 2004/0192259 A1 | 9/2004 | Xie | |
| 2008/0132226 A1 * | 6/2008 | Carnall | H04L 63/30 455/425 |
| 2010/0048235 A1 * | 2/2010 | Dai | G11B 27/105 455/518 |
| 2014/0368601 A1 * | 12/2014 | deCharms | H04W 4/021 348/14.02 |

* cited by examiner

*Primary Examiner* — Fayyaz Alam

(57) ABSTRACT

A wireless communication assembly for enhancing public safety includes a base station. The base station is configured to record incoming and outgoing communications. Each of a plurality of communicators is configured to communicate with the base station. A respective communicator is configured to communicate with the plurality of communicators. The base station is configured to record incoming and outgoing communications with the plurality of communicators. The respective communicator is configured to communicate with the plurality of communicators.

17 Claims, 3 Drawing Sheets

WIRELESS COMMUNICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
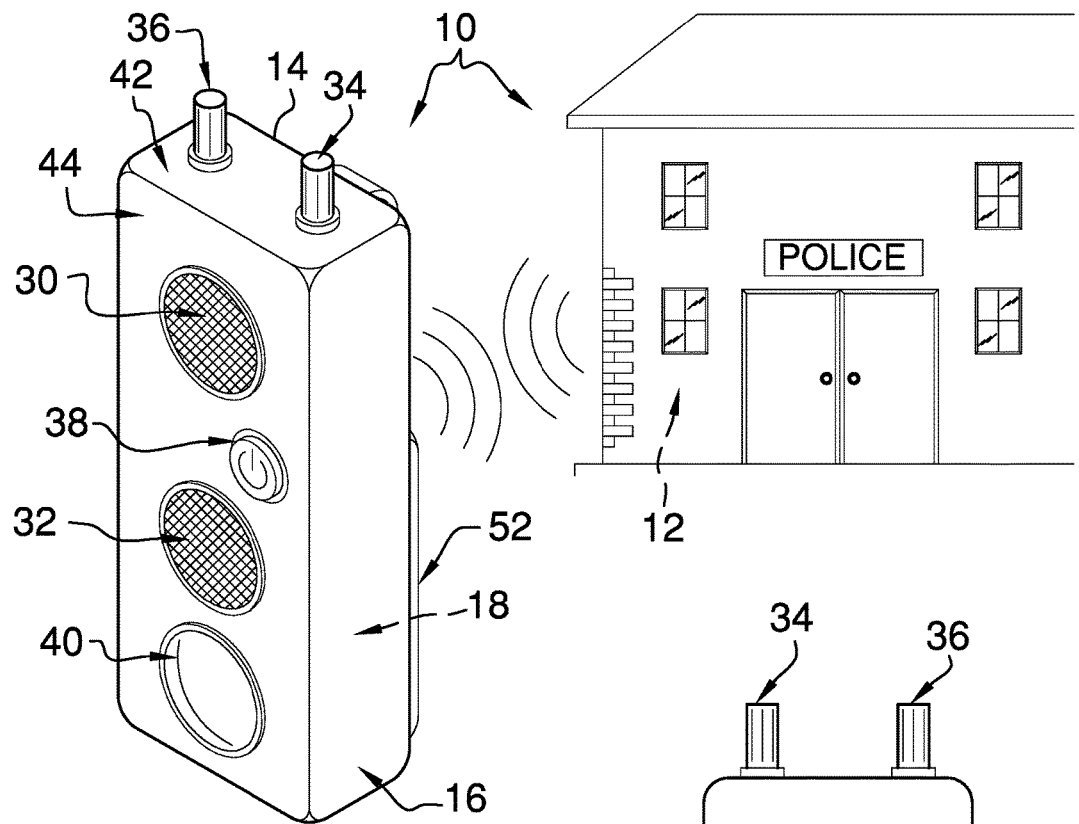

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to communication assemblies and more particularly pertains to a new wireless communication assembly for enhancing public safety.

BRIEF SUMMARY OF THE INVENTION

An embodiment of the disclosure meets the needs presented above by generally comprising a base station. The base station is configured to record incoming and outgoing communications. Each of a plurality of communicators is configured to communicate with the base station. A respective communicator is configured to communicate with the plurality of communicators. The base station is configured to record incoming and outgoing communications with the plurality of communicators. The respective communicator is configured to communicate with the plurality of communicators.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

Figure 2:
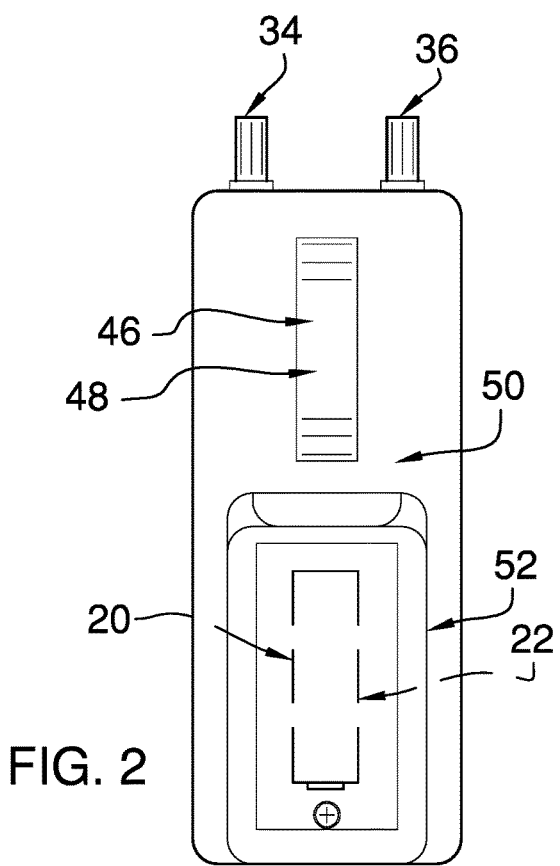
Figure 3:
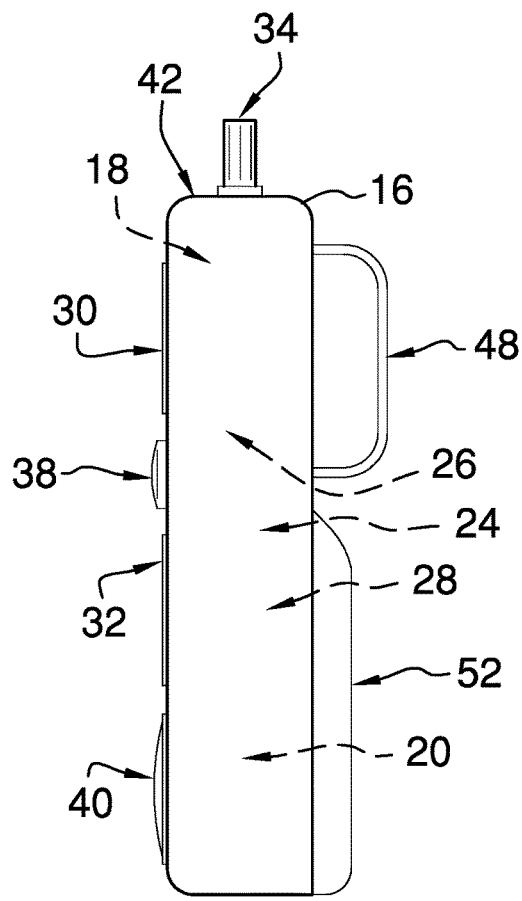
Figure 4:
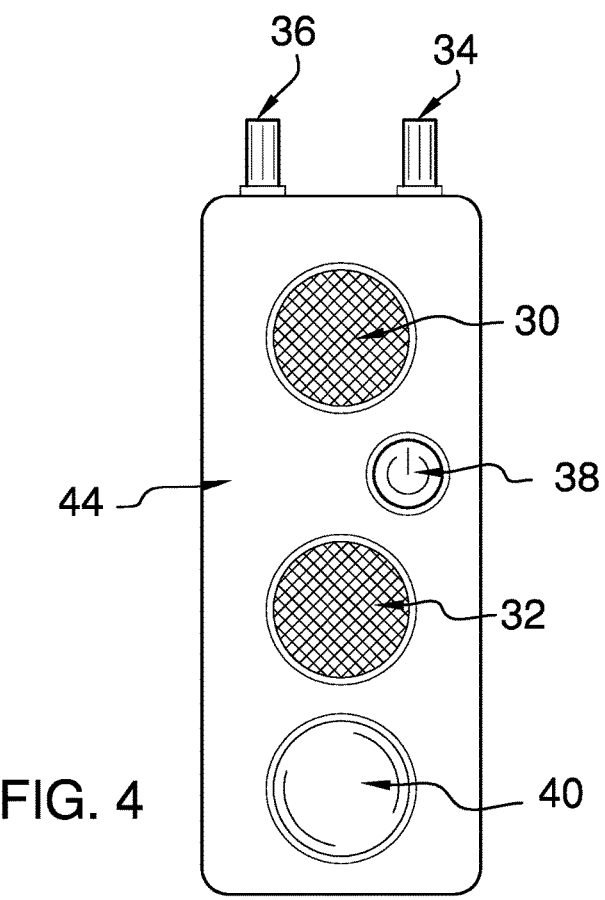
Figure 5:
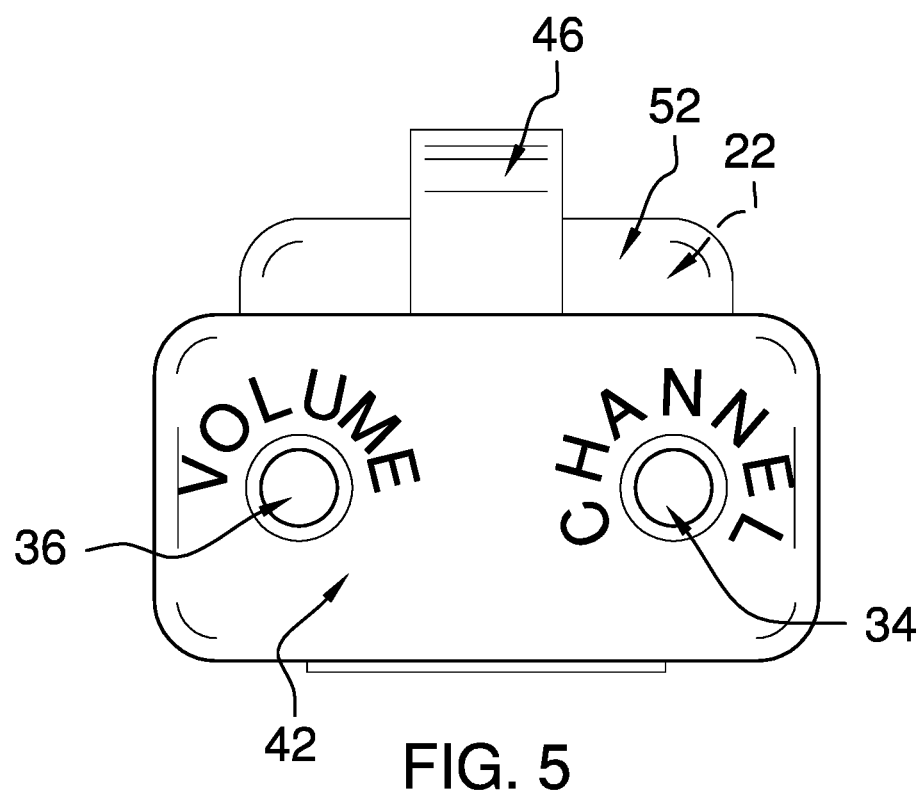

The disclosure will be better understood and objects other than those set forth above will become apparent when consideration is given to the following detailed description thereof. Such description makes reference to the annexed drawings wherein:

FIG. 1 is an isometric perspective view of a wireless communication assembly according to an embodiment of the disclosure.
FIG. 2 is a back view of an embodiment of the disclosure.
FIG. 3 is a side view of an embodiment of the disclosure.
FIG. 4 is a front view of an embodiment of the disclosure.
FIG. 5 is a top view of an embodiment of the disclosure.

DETAILED DESCRIPTION OF THE INVENTION

With reference now to the drawings, and in particular to FIGS. 1 through 5 thereof, a new communication assembly embodying the principles and concepts of an embodiment of the disclosure and generally designated by the reference numeral 10 will be described.

As best illustrated in FIGS. 1 through 5, the wireless communication assembly 10 generally comprises a base station 12. The base station 12 is configured to record incoming and outgoing communications. Each of a plurality of communicators 14 is configured to communicate with the base station 12. A respective communicator 14 is configured to communicate with the plurality of communicators 14.

Each communicator 14 comprises a housing 16 that defines an internal space 18. The housing 16 is substantially rectangularly box shaped. A power module 20 is coupled to the housing 16 and is positioned in the internal space 18. The power module 20 comprises at least one battery 22. The at least one battery 22 is rechargeable.

A microprocessor 24 is coupled to the housing 16 and is positioned in the internal space 18. The microprocessor 24 is operationally coupled to the power module 20. A transmitter 26 and a receiver 28 are coupled to the housing 16 and positioned in the internal space 18. A microphone 30 and a speaker 32 are coupled to a front 44 of the housing 16. The transmitter 26, the receiver 28, the microphone 30 and the speaker 32 are operationally coupled to the microprocessor 24.

The microphone 30 is positioned to relay sounds from an area proximate to a user to the microprocessor 24 as a first audio signal. The microprocessor 24 is positioned to motivate the transmitter 26 to send the first audio signal to the base station 12. The receiver 28 is positioned to relay a second audio signal received from the base station 12 to the microprocessor 24. The microprocessor 24 is positioned to relay the second audio signal to the speaker 32. The second audio signal is emitted from the speaker 32. The base station 12 is configured to record the first audio signal and the second audio signal.

A selector 34, a volume control 36, an On/Off button 38 and an override button 40 are coupled to the housing 16 and are operationally coupled to the microprocessor 24. The selector 34 is positioned on the housing 16 such that the selector 34 is configured for the user to select a channel to send the first audio signal and to receive the second audio signal. The volume control 36 is positioned on the housing 16 such that the volume control 36 is configured for the user to adjust the amplitude of the second audio signal. In one embodiment, the selector 34 and the volume control 36 are positioned on a top 42 of the housing 16.

The On/Off button 38 is positioned on the housing 16 and is configured for the user to turn the communicator 14 on and to turn the communicator 14 off. The override button 40 is positioned on the housing 16 and is configured for a respective communicator 14 to compel the base station 12 to relay the first audio signal from the respective communicator 14 to the plurality of communicators 14. The override button 40 also is positioned to compel the base station 12 to override second audio signals from the base station 12 and the plurality of communicators 14. In one embodiment, the On/Off button 38 and the override button 40 are positioned on the front 44 of the housing 16.

A coupler 46 is coupled to the housing 16 and is configured to couple to a user. The coupler 46 is positioned on the housing 16 such that the coupler 46 is configured to couple the respective communicator 14 to the user. In one embodiment, the coupler 46 comprises a loop 48. The loop 48 is configured to insert a belt of the user. The loop 48 is positioned on the housing 16 such that the loop 48 is configured to insert the belt of the user to couple the respective communicator 14 to the user. In one embodiment, the coupler 46 is positioned on a back 50 of the housing 16.

A cover 52 is reversibly couplable to the housing 16. The cover 52 is positioned proximate to the power module 20. The cover 52 is positioned on the housing 16 such that the cover 52 is configured for removal by the user to access the power module 20. In one embodiment, the cover 52 is positioned on the back 50 of the housing 16.

In use, the base station 12 is configured to record incoming and outgoing communications with the plurality of communicators 14. A respective communicator 14 is configured to communicate with the plurality of communicators 14. The microphone 30 is positioned to relay sounds from an area proximate to a user to the microprocessor 24 as a first audio signal. The microprocessor 24 is positioned to motivate the transmitter 26 to send the first audio signal to the base station 12. The receiver 28 is positioned to relay a second audio signal received from the base station 12 to the microprocessor 24. The microprocessor 24 is positioned to relay the second audio signal to the speaker 32, such that the second audio signal is emitted from the speaker 32. The volume control 36 is configured for the user to adjust the amplitude of the second audio signal. The base station 12 is configured to record the first audio signal and the second audio signal. The selector 34 is configured for the user to select a channel to send the first audio signal and to receive the second audio signal. The override button 40 is configured such that a respective communicator 14 is positioned to compel the base station 12 to relay the first audio signal from the respective communicator 14 to the plurality of communicators 14. The override button 40 also is positioned to compel the base station 12 to override second audio signals from the base station 12 and the plurality of communicators 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wireless communication assembly comprising:
   a base station, said base station being configured to record incoming and outgoing communications;
   a plurality of communicators, each said communicator being configured to communicate with said base station, a respective said communicator being configured to communicate with said plurality of communicators; and
   wherein said base station is configured to record incoming and outgoing communications with said plurality of communicators, and wherein said respective said communicator is configured to communicate with said plurality of communicators; and
   wherein each said communicator comprises
      a housing defining an internal space,
      a power module coupled to said housing and positioned in said internal space,
      a microprocessor coupled to said housing and positioned in said internal space, said microprocessor being operationally coupled to said power module,
      a transmitter coupled to said housing and positioned in said internal space, said transmitter being operationally coupled to said microprocessor,
      a microphone coupled to a front of said housing, said microphone being operationally coupled to said microprocessor,
      a receiver coupled to said housing and positioned in said internal space, said receiver being operationally coupled to said microprocessor,
      a speaker coupled to said front said housing, said speaker being operationally coupled to said microprocessor,
      wherein said microphone is positioned to relay sounds from an area proximate to a user to said microprocessor as a first audio signal, wherein said microprocessor is positioned to motivate said transmitter to send the first audio signal to said base station, wherein said receiver is positioned to relay a second audio signal received from said base station to said microprocessor, such that said microprocessor is positioned to relay the second audio signal to said speaker, wherein the second audio signal is emitted from said speaker, and wherein said base station is configured to record the first audio signal and the second audio signal, and
      an override button coupled to said housing, said override button being operationally coupled to said microprocessor, wherein said override button is positioned on said housing such that said override button is configured such that a respective said communicator is positioned to compel said base station to relay the first audio signal from said respective said communicator to said plurality of communicators, and wherein said override button is positioned to compel said base station to override second audio signals from said base station and said plurality of communicators.

2. The assembly of claim 1, further including said housing being substantially rectangularly box shaped.

3. The assembly of claim 1, further including said power module comprising at least one battery.

4. The assembly of claim 3, further including said at least one battery being rechargeable.

5. The assembly of claim 1, further including a selector coupled to said housing, said selector being operationally coupled to said microprocessor, wherein said selector is positioned on said housing such that said selector is configured for the user to select a channel for sending the first audio signal and receiving the second audio signal.

6. The assembly of claim 5, further including said selector being positioned on a top of said housing.

7. The assembly of claim 1, further including a volume control coupled to said housing, said volume control being operationally coupled to said microprocessor, wherein said volume control is positioned on said housing such that said volume control is configured for the user to adjust the amplitude of the second audio signal.

8. The assembly of claim 7, further including said volume control being positioned on a top of said housing.

9. The assembly of claim 1, further including an On/Off button coupled to said housing, said On/Off button being operationally coupled to said microprocessor, wherein said On/Off button is positioned on said housing such that said On/Off button is configured for the user to turn said communicator on and to turn said communicator off.

10. The assembly of claim 9, further including said On/Off button being positioned on said front of said housing.

11. The assembly of claim 1, further including said override button being positioned on said front of said housing.

12. The assembly of claim 1, further including a coupler coupled to said housing, said coupler being configured to couple to a user, wherein said coupler is positioned on said housing such that said coupler is configured to couple said respective said communicator to the user.

13. The assembly of claim 12, further including said coupler comprising a loop, said loop being configured for insertion of a belt of the user, wherein said loop is positioned on said housing such that said loop is configured for insertion of the belt of the user to couple said respective said communicator to the user.

14. The assembly of claim 13, further including said coupler being positioned on a back of said housing.

15. The assembly of claim 1, further including a cover reversibly couplable to said housing, said cover being positioned proximate to said power module, wherein said cover is positioned on said housing such that said cover is configured for removal by the user to access said power module.

16. The assembly of claim 15, further including said cover being positioned on said back of said housing.

17. A wireless communication assembly comprising:
  a base station, said base station being configured to record incoming and outgoing communications;
  a plurality of communicators, each said communicator being configured to communicate with said base station, a respective said communicator being configured to communicate with said plurality of communicators, each said communicator comprising:
    a housing defining an internal space, said housing being substantially rectangularly box shaped,
    a power module coupled to said housing and positioned in said internal space, said power module comprising at least one battery, said at least one battery being rechargeable,
    a microprocessor coupled to said housing and positioned in said internal space, said microprocessor being operationally coupled to said power module,
    a transmitter coupled to said housing and positioned in said internal space, said transmitter being operationally coupled to said microprocessor,
    a microphone coupled to a front of said housing, said microphone being operationally coupled to said microprocessor,
    a receiver coupled to said housing and positioned in said internal space, said receiver being operationally coupled to said microprocessor,
    a speaker coupled to said front said housing, said speaker being operationally coupled to said microprocessor, and
    wherein said microphone is positioned to relay sounds from an area proximate to a user to said microprocessor as a first audio signal, wherein said microprocessor is positioned to motivate said transmitter to send the first audio signal to said base station, wherein said receiver is positioned to relay a second audio signal received from said base station to said microprocessor, such that said microprocessor is positioned to relay the second audio signal to said speaker, wherein the second audio signal is emitted from said speaker, and wherein said base station is configured to record the first audio signal and the second audio signal;
  a selector coupled to said housing, said selector being operationally coupled to said microprocessor, wherein said selector is positioned on said housing such that said selector is configured for the user to select a channel for sending the first audio signal and receiving the second audio signal, said selector being positioned on a top of said housing;
  a volume control coupled to said housing, said volume control being operationally coupled to said microprocessor, wherein said volume control is positioned on said housing such that said volume control is configured for the user to adjust the amplitude of the second audio signal, said volume control being positioned on said top of said housing;
  an On/Off button coupled to said housing, said On/Off button being operationally coupled to said microprocessor, wherein said On/Off button is positioned on said housing such that said On/Off button is configured for the user to turn said communicator on and to turn said communicator off, said On/Off button being positioned on said front of said housing;
  an override button coupled to said housing, said override button being operationally coupled to said microprocessor, wherein said override button is positioned on said housing such that said override button is configured such that a respective said communicator is positioned to compel said base station to relay the first audio signal from said respective said communicator to said plurality of communicators, and wherein said override button is positioned to compel said base station to override second audio signals from said base station and said plurality of communicators, said override button being positioned on said front of said housing;
  a coupler coupled to said housing, said coupler being configured to couple to a user, wherein said coupler is positioned on said housing such that said coupler is configured to couple said respective said communicator to the user, said coupler comprising a loop, said loop being configured for insertion of a belt of the user, wherein said loop is positioned on said housing such that said loop is configured for insertion of the belt of the user to couple said respective said communicator to the user, said coupler being positioned on a back of said housing;

a cover reversibly couplable to said housing, said cover being positioned proximate to said power module, wherein said cover is positioned on said housing such that said cover is configured for removal by the user to access said power module, said cover being positioned on said back of said housing; and wherein said base station is configured to record incoming and outgoing communications with said plurality of communicators, and wherein a respective said communicator is configured to communicate with said plurality of communicators, wherein said microphone is positioned to relay sounds from an area proximate to a user to said microprocessor as a first audio signal, wherein said microprocessor is positioned to motivate said transmitter to send the first audio signal to said base station, wherein said receiver is positioned to relay a second audio signal received from said base station to said microprocessor, such that said microprocessor is positioned to relay the second audio signal to said speaker, wherein the second audio signal is emitted from said speaker, and wherein said base station is configured to record the first audio signal and the second audio signal, wherein said selector is positioned on said housing such that said selector is configured for the user to select a channel for sending the first audio signal and receiving the second audio signal, wherein said volume control is positioned on said housing such that said volume control is configured for the user to adjust the amplitude of the second audio signal, wherein said override button is positioned on said housing such that said override button is configured such that a respective said communicator is positioned to compel said base station to relay the first audio signal from said respective said communicator to said plurality of communicators, and wherein said override button is positioned to compel said base station to override second audio signals from said base station and said plurality of communicators.

* * * * *